United States Patent
Kohn et al.

(10) Patent No.: US 6,570,990 B1
(45) Date of Patent: May 27, 2003

(54) METHOD OF PROTECTING HIGH DEFINITION VIDEO SIGNAL

(75) Inventors: Leslie Kohn, Fremont, CA (US); David A. Barr, San Jose, CA (US); Didier Le Gall, Los Altos, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/192,102

(22) Filed: Nov. 13, 1998

(51) Int. Cl.[7] .................. H04N 7/167; H04N 7/171; H04L 9/20
(52) U.S. Cl. .................. 380/213; 380/205; 380/214; 380/223; 380/268
(58) Field of Search ................. 380/213, 205, 380/200, 46, 284, 281, 203, 201, 214, 216, 217, 218, 223, 261, 268; 348/590, 659; 705/57; 713/169

(56) References Cited

U.S. PATENT DOCUMENTS

| 3,963,865 A |   | 6/1976 | Songer ............... 178/7.1 |
| 4,405,942 A |   | 9/1983 | Block et al. ............ 358/119 |
| 4,642,688 A |   | 2/1987 | Lowry et al. ............ 380/11 |
| 4,747,138 A | * | 5/1988 | Marie et al. ............ 380/215 |
| 4,914,694 A |   | 4/1990 | Leonard et al. .......... 380/5 |
| 5,034,981 A |   | 7/1991 | Leonard et al. .......... 380/5 |
| 5,412,730 A | * | 5/1995 | Jones ................... 380/262 |
| 5,636,279 A | * | 6/1997 | Katta et al. ............ 380/217 |
| 5,764,770 A | * | 6/1998 | Schipper et al. ........ 380/25 |
| 6,021,196 A | * | 2/2000 | Sandford, II et al. ..... 380/4 |
| 6,223,285 B1 | * | 4/2001 | Komuro et al. .......... 713/160 |

FOREIGN PATENT DOCUMENTS

EP    0 554 724 A1 * 8/1993 .......... H04N/5/782

* cited by examiner

Primary Examiner—Justin T. Darrow
(74) Attorney, Agent, or Firm—Christopher P. Maiorana, PC

(57) ABSTRACT

A system controls reproduction of a video transmission between a transmitter and a receiver. The system includes an encryptor with an offset generator adapted to receive the encrypted frame key and to generate a sequence, of pseudo-random values for the color component; and an adder coupled to the offset generator and to the color component signal for providing an encoded color component signal. The system also includes a decryptor with a decryptor offset generator adapted to receive the encrypted frame key and to generate a decryptor pseudo-random value for the color component; and a subtractor coupled to the offset generator and to the color component signal for subtracting the offset signal from the color component signal.

25 Claims, 10 Drawing Sheets

METHOD OF PROTECTING HIGH DEFINITION VIDEO SIGNAL

BACKGROUND OF THE INVENTION

Inexorable advances in consumer electronics have led to affordable digital video devices capable of rendering crisp images with high fidelity audio. The emergence of digital video devices with recording capability represents a significant threat to content providers, since the content of high quality digital programs can be easily duplicated. The motion picture, film and video industry estimate that substantial sums have been lost annually due to unauthorized duplication. Such unauthorized duplication deprives the rightful owners or distributors of program content of their income and reduces their incentive to produce new movies and videos. Thus, the protection of program contents especially high definition digital program content, from unauthorized copying is an important problem facing the consumer electronics industry.

Due to the need for a secure transmission of programs, a number of video encoding or scrambling techniques have been developed to provide control over potential recipients and to prevent unauthorized use of received transmissions. For instance, to block reception by non-subscribers, television subscription networks typically encode or scramble the distributed television signals, thereby defeating acceptable display of those television signals by non-subscribers who do not have the proper decoders or descramblers.

However, an authorized subscriber may simply connect a video recorder to his decoder to record for subsequent and repeated viewing a desired program that is distributed over the subscription network. Such recording for later viewing decreases the market interest in subsequent distribution of that program over the subscription network. For instance, "pay per view" broadcasts contemplate a once-only distribution of video programming such as first run motion pictures, popular sporting events and special entertainment events to subscribers who are charged a one-time fee to receive that particular program. Such one-time broadcasting is quite sensitive to unauthorized reproductions which erode the value of the content of the pay-per-view transmission.

Since the scrambling or encoding of the video signal cannot prevent a paying subscriber from recording the program, it is desired that the video signal be modified so that the subscriber can view the program, but the operation of recording equipment should.be defeated or tightly controlled to avoid unauthorized recording.

Traditionally, with monitors or display devices that accept analog input signals, methods for making the video signal non-recordable have relied upon adjusting an automatic gain control (AGC) circuit normally included in a videotape recorder. Other techniques for modifying the video signal to prevent its recording or reproduction rely on the relative sensitivity of a vertical sync detection circuit normally provided in videotape recorders. The removal of a portion of the pulses intended for a vertical blanking interval causes a vertical synchronizing detector included in most videotape recorders to be unable to detect those vertical sync pulses, resulting in a loss of control information needed for the proper operation of the videotape recorder.

The advent of digital video recorders that accept high definition analog video inputs has necessitated new solutions for protecting the high definition content. Methods have been developed for encrypting digital data for transmission over high speed digital interfaces, such as IEEE-1394. However, there presently is not a cost-effective digital transmission interface for transmitting uncompressed high definition digital video for consumer applications which require transmission rates of greater than 1 Gigabit/second. For example, the fastest current IEEE-1394 interface standard supports transmission rates of less than 400 Megabits/second. Using compressed bitstreams to transfer the digital data from the set top box to the receiver is problematic because the transmitter needs a high definition Motion Pictures Experts Group (MPEG) encoder to handle locally generated video information such as on screen displays or electronic program guides. Additionally, high definition MPEG encoders are not cost effective for consumer applications.

SUMMARY OF THE INVENTION

The invention provides a transmitter for encoding video transmission to a receiver, the transmitter and the receiver communicating over a digital interface and a video interface. The digital interface communicates a frame key encrypted between the transmitter and the receiver, while the video interface having a color component signal. The transmitter includes a sequence generator adapted to receive the original frame key and to generate a sequence of pseudo-random values for the color component; and a transformation circuit connected to the sequence generator and to the color component signal for providing an encoded color component signal.

Implementations of the invention include one or more of the following. A range clamp may be positioned between the color component signal and the transformation circuit for restricting the value of the color component signal to a predetermined range. An encrypted region generator may be connected to the transformation circuit for limiting the set of transformed pixels to a predetermined region of a video frame. The transformation circuit may be an adder. A new offset may be generated for each scan line. A delay memory for time-shifting the output of the transformation circuit may be used.

In a second aspect, a receiver decodes video transmission from the transmitter. The receiver includes a decryptor sequence generator adapted to receive and decrypt the frame key and to generate a sequence of pseudo-random values for the color component; and an inverse transformation circuit connected to the decryptor sequence generator and to the color component signal for decoding the color component signal.

Implementations of the invention include one or more of the following. The inverse transformation circuit includes a subtractor for subtracting the pseudo-random value from the color component signal. A comparator may be connected to the subtractor, the comparator determining whether the output of the subtractor exceeds a minimum value; a multiplexer may be connected to the comparator and receiving a first value and a second value, the multiplexer outputting the first value if the output of the subtractor exceeds the minimum value and otherwise outputting the second value; and an adder may be connected to the multiplexer and to the subtractor. A gain/offset adjuster may be connected to the adder. The transmitter may have a delay memory for time-shifting of pixel values to be transmitted. A receiver delay memory may be used for inverse time-shifting of transmitted pixel values. A pixel clock generator may be connected to the color component signal for generating a clock signal. The pixel clock generator includes a phase locked loop which aligns the clock signal with a video sync pulse.

In another aspect, a method for controlling reproduction of video transmission between the transmitter and the receiver, including: communicating a frame key over the digital interface; generating a sequence of pseudo-random offsets for the color component signal based on the unencrypted frame key; generating an encoded color component signal using one of the pseudo-random offsets; and transmitting the encoded color component signal over the video interface.

Implementations of the invention include one or more of the following. The method includes seeding a pseudo random number generator with the encrypted frame key. The method includes periodically generating a new encrypted frame key; and initializing a pseudo random number generator with the new encrypted frame key. The method includes scaling the color component signal with a predetermined ratio; and adding an offset to the scaled color component signal. The method includes clamping the color component signal within a predetermined range. The clamping step further determining if the value of the color component signal is less than a first value and if so, setting the value of the color component signal to the first value; and determining if the value of the color component signal is greater than a second value and if so, setting the value of the color component signal to the second value. The method includes determining whether each pixel is in an encrypted boundary; and transmitting the pixel unencrypted if the pixel is outside of the encrypted boundary. The method includes converting the encoded color component signal to an analog signal. The method includes shifting each pixel value in time within the predetermined pixel range, wherein the shifting further comprises providing the encoded color component signal to a delay memory. The method includes decrypting the color component signal sent over the video interface by receiving the encrypted frame key over the digital interface; generating a sequence of pseudo-random offsets for the color component signal based on the encrypted frame key. A pseudo random number generator may be generated with the frame key. The method may subtract the pseudo-random offset from the encoded color component signal. The method includes compensating for out-of-range values associated with the subtracting step and/or resealing the color component signal to its original input range. The method includes shifting each pixel value within the predetermined pixel range prior to the step of transmitting the encoded color component signal over the video interface. The method includes undoing the pixel shift operation using a delay memory. The method includes displaying the color component signal after decrypting the encoded color component signal.

In another aspect, a method for controlling the reproduction of a video transmission between the transmitter and the receiver includes authenticating the transmitter and the receiver using the digital interface; periodically transmitting an encrypted frame key to the receiver over the digital interface; generating a pseudo-random offset at the transmitter for each color component signal during an active part of a scan line; applying the pseudo-random offset to the color component signal to generate an encoded color component signal; transmitting the encoded color component signal over the video interface; generating the pseudo-random offset at the receiver based on the decrypted frame key; removing the pseudo-random offset from the encoded color component signal transmitted over the video interface to generate a decoded color component signal; and displaying the decoded color component signal on a display device.

In another aspect, a system controls the reproduction of video transmission between the transmitter and the receiver. The system having an encryptor with an offset generator adapted to receive the original frame key and to generate a sequence of pseudo-random values for the color component; and an adder connected to the offset generator and to the color component signal for providing an encoded color component signal. The system also having a decryptor with a decryptor offset generator adapted to receive and decrypted the frame key and to generate a decryptor pseudo-random value for the color component; and a subtractor connected to the offset generator and to the color component signal for subtracting the offset signal from the color component signal.

Implementations of the invention include one or more of the following. The color component signal includes one of red, green and blue (RGB) video signals, one of luminance and chrominance video signals, or a black and white video signal.

Advantages of the invention include one or more of the following. The invention controls the recording and reproduction of high quality program content, particularly when the program content is transmitted from one consumer device, such as a set-top box or a personal computer, to another consumer device, such as a monitor. Unauthorized duplication or piracy of high quality program content from digital storage media, cable and broadcast television material is avoided. The security of the video transmission is achieved while maintaining a high picture quality. By operating on the video output signals, the invention avoids the need to compress the entire high definition program locally with information generated by on screen display devices (OSDs) or other graphic devices such as 3D video controllers. The invention also avoids the need to decompress the video bitstream at the receiver. The piracy protection of the program content is achieved cost effectively.

Other features and advantages of the invention will become apparent from the following description, including the drawings and claims.

DESCRIPTION

Figure 1:
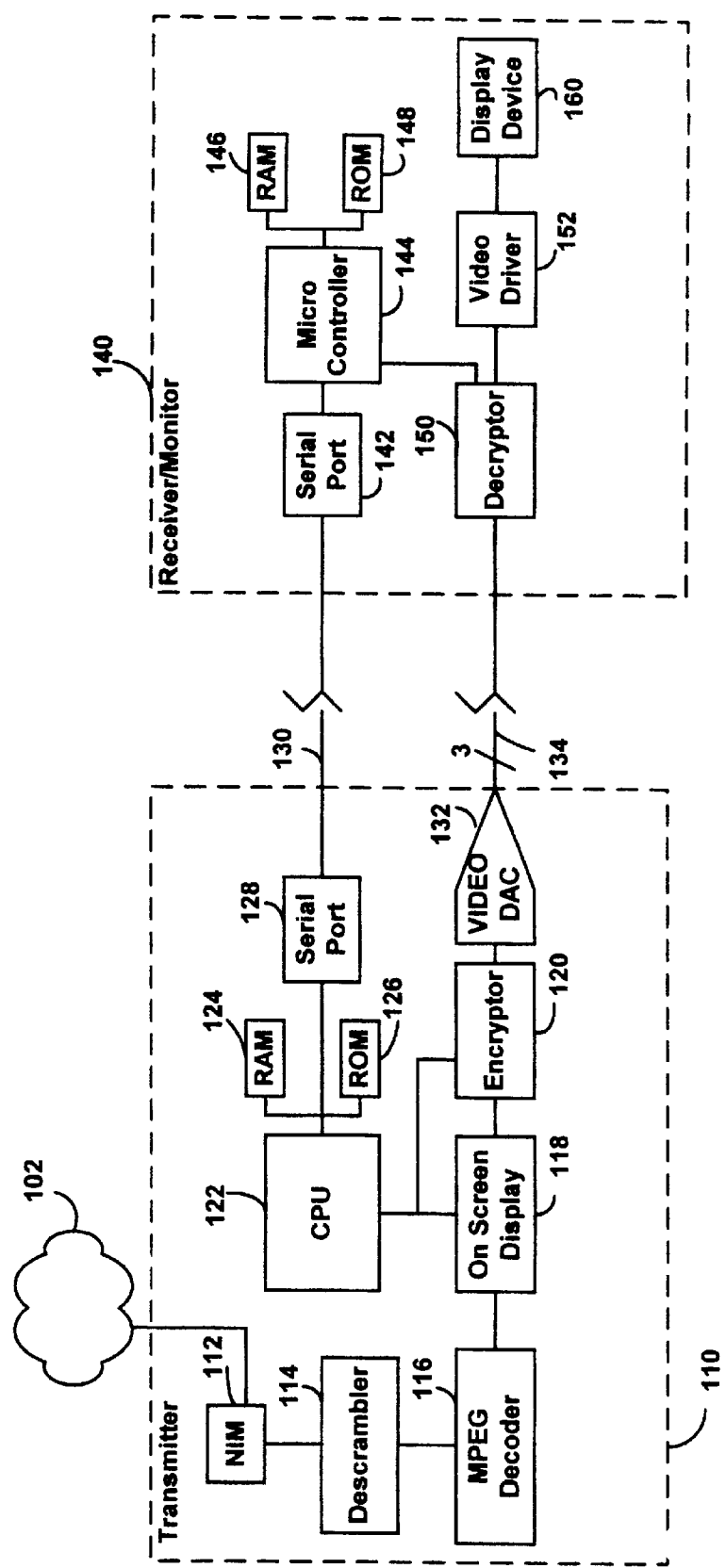
FIG. 1 is a diagram of a system for controlling reproduction of high quality program content.

FIG. 1 shows a transmitter-receiver pair which is adapted to display high definition program content. A transmitter 110 receives a high definition compressed bitstream from a network 102. Network 102 may be a cable, terrestrial or satellite broadcast network. Alternatively, other suitable digital program sources such as DVD, digital tape, or hard disks may be used. Transmitter 110 communicates with network 102 using a network interface module (NIM) 112. The output of the NIM 112 is an encrypted video bitstream which is directed to a descrambler 114. Descrambler 114 allows only an authorized user to decode a particular program (pay-per-view). For instance, certain channels offer movies, sports, or special events and charge by the movie or program. Through descrambler 114, a content provider controls which channels to descramble and descrambler 114 allows the pay-per-view programs to be viewed only after payment or authorization.

The output of descrambler 114 is provided to a Motion Pictures Experts Group (MPEG) decoder 116. MPEG decoder 116 decompresses video data by first decoding a reference frame and then decoding subsequent frames in terms of changes from the reference frame. This process efficiently transmits motion video since much of the image data remains constant from one frame to another frame.

The output of MPEG decoder 116 is provided to an on screen display (OSD) buffer 118 which is controlled by a Central Processing Unit (CPU) 122. CPU 122, through OSD buffer 118 can augment the video decoded by MPEG decoder 116 to provide supplemental information, such as channel guide or web browsing, on a monitor screen.

Figure 2:
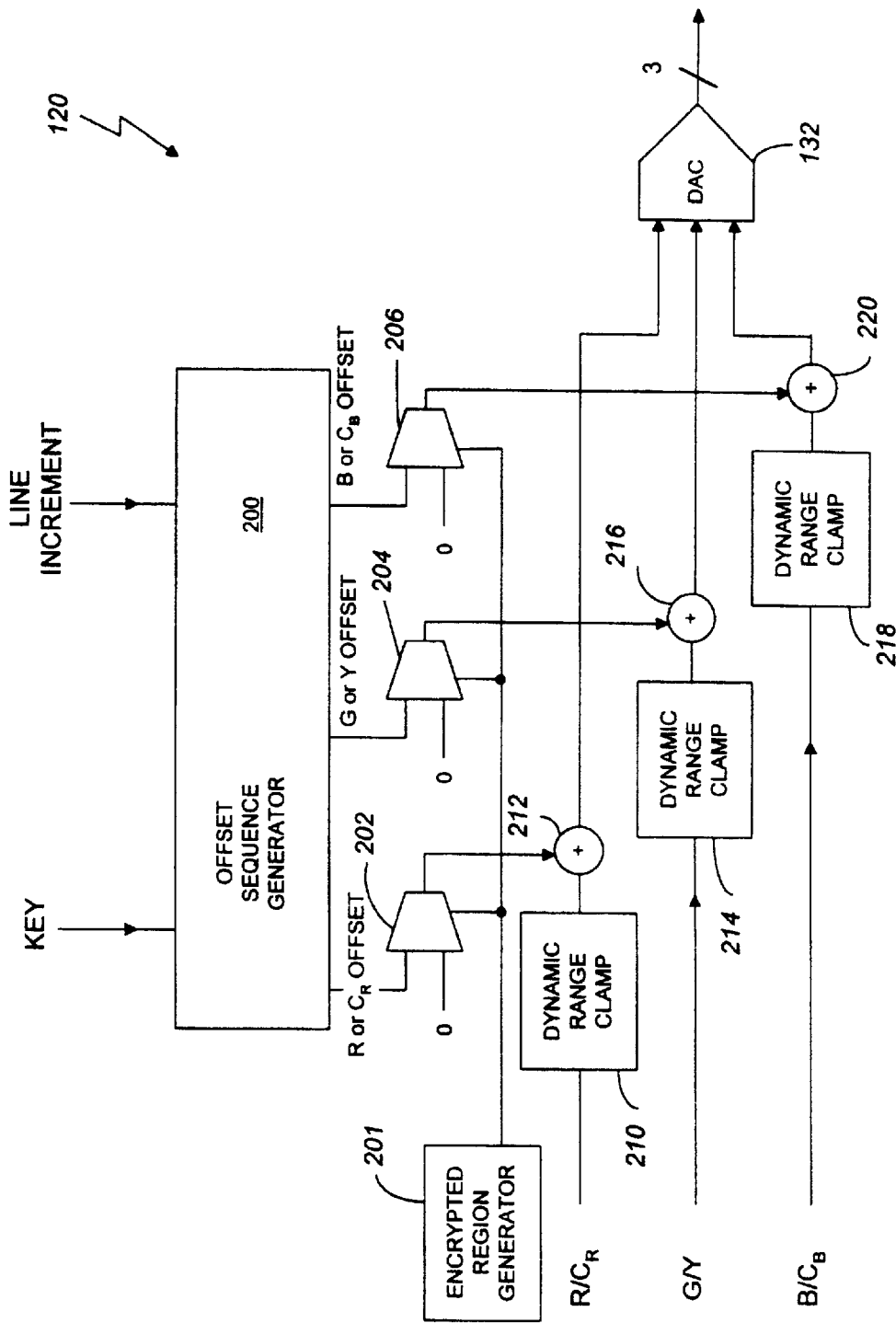
FIG. 2 is a block diagram illustrating in more detail the encryptor of FIG. 1.

CPU 122 is also connected to an encryptor 120 which is shown in more detail in FIG. 2. The output of encryptor 120 is provided to a video digital to analog converter (DAC) 132. Since color is supported, video DAC 132 has three outputs, one for each of the red blue green (RGB) channels. Alternatively, the video DAC outputs may drive one or more component video signals with luminance and chrominance (color difference) signals ($YC_RC_B$). Further, the video DAC outputs may support one channel, such as the channel in NTSC or PAL, or two channels such as those in S-video with a luminance signal and multiplexed chrominance signals. Referring now to FIG. 1, the outputs of video DAC 132, which carry encrypted high definition video signals with embedded sync signals, are provided to an video cable 134. Video cable 134 may be bundled with a digital interface cable 130 as one cable or separately as two cables.

CPU 122 is also connected to a random access memory (RAM) 124, a read-only memory (ROM) 126, and a digital interface such as a serial port 128. The output of serial port 128 drives digital interface cable 130. Serial Port 128 transmits and receives digital data, such as encryption and decryption related information. Other information, such as the number of copies that a user is authorized to make, is also transmitted over serial port 128 and cable 130.

Low bandwidth digital data is transmitted over digital interface cable 130 to and from a port 142, which may be a serial port, on receiver 140. Serial port 142, is connected to a micro-controller or CPU 144. Microcontroller 144 in turn is connected to RAM 146 and ROM 148. Additionally, receiver 140 receives video signals from video cable 134. The video signals are processed by decryptor 150, which is shown in more detail in FIG. 3. Video content which appears at the output of decryptor 150 is provided to a plurality of video drivers, one of which drivers, 152, is shown. Video drivers 152 in turn drive a display device 160 such as a cathode ray tube (CRT) or plasma display.

Transmitter 110 and receiver 140 operate on a series of video frames. Each frame is generated using a progressive or an interlaced series of horizontal lines which are transmitted sequentially in time. The transmitted signal is a continuous analog of a brightness intensity corresponding to each pixel of a line. Each line has a period during which video information is transmitted (active line). Any two adjacent active line periods are separated by a period in which no video information is transmitted (line blanking interval). This interval is introduced to allow a scanning device (not shown) in receiver 140 to reset a line start counter.

Digital interfaces 128 or 142 transfers data which is used for authentication and subsequent transmission of encrypted frame keys between transmitter 110 and receiver 140. Authentication and transmission of encrypted keys can use known cryptographic protocols based on public key encryption, for example the elliptic curve digital signature and key exchange algorithms described in IEEE P1363. The authentication protocol results in a shared session key between the transmitter and receiver. Using a secret random number generator, the transmitter generates a sequence of frame keys. The transmitter encrypts each frame key using the session key with a symmetric encryption algorithm such as DES, and sends it to the receiver over digital cable 130.

Receiver 140 decrypts the frame key using its copy of the session key. The decrypted frame key is used to seed a pseudo-random number generator. The pseudo-random number generator, as discussed below, is used to generate three random values for each line of each video frame. An identical pseudo-random number generator is used by the transmitter to generate the same three random values for each line of each video frame. Since the decrypted frame keys are not known to unauthenticated receivers, the random values cannot be duplicated by eavesdropping on serial ports 128 or 142, even if the pseudo-random number generation process is known. Transmitter 110 can transmit new frame keys at regular intervals to ensure that security is maintained even if one encrypted frame key is compromised. The interval between frame keys can be several frame times, so the communication speed of serial ports 128 or 142 can be slow compared to the speed associated with the transmission of uncompressed video data over video cable 134.

Referring now to FIG. 2, encryptor 120 is shown in more detail. Encryptor 120 has an offset sequence generator 200 which receives as inputs an unencrypted frame key input and a line increment input. Offset sequence generator 200 is controlled by CPU 122 (FIG. 1). The frame key input is used as a seed to initialize a pseudo-random number generator in offset sequence generator 200.

Offset sequence generator 200 uses the seed to generate a new sequence of pseudo-random numbers. If offset sequence generator 200 is subsequently called with the same seed, the sequence of pseudo-random numbers will be repeated. The pseudo-random number generator may execute the following functions for example:

```
static unsigned long int next = 1;
int myrand(void)    /* RAND_MAX assumed to be 32767 */
{
        next = next * 1103515245 + 12345;
        return((unsigned int) (next/65536) % 32768);
}
void mysrand(unsigned int seed)
{
        next = seed;
}
```

In response to the line increment input which tells encryptor 120 to generate the next video line, offset sequence generator 200 generates three random values, one for each color component. The three random values for each scan line are used to generate a separate offset for each analog signal component during an active and changing part of the scan line. Given a particular frame key, offset sequence generator 200 provides a fixed sequence of offsets for each video line. The fixed sequence can be generated on both the transmitter side and the receiver side so that each uses the same set of offsets. The secrecy of the frame key is maintained through encryption. Furthermore the frame key can be changed at predetermined intervals such as every few frames.

The offset sequence generator selects a one-to-one transformation function unique to each scan line for the RGB or $YC_RC_B$ color component signals. Each of the three color component outputs of offset sequence generator 200 is provided to one input of multiplexers 202, 204 and 206, respectively. The other inputs of multiplexers 202, 204 and 206 receive zero. The select input of multiplexers 202, 204 and 206 are driven by an encrypted region generator 201 which stores a window indicating where pixels are encrypted. When the pixels are to be encrypted, the outputs of offset sequence generator 200 are used. Otherwise, the outputs of multiplexers 202, 204 and 206 are zero. Each offset has the same maximum representable value as the video component color signals.

Each of the video component color signals, either RGB signals or $YC_RC_B$ signals, are provided to three dynamic range clamps 210, 214 and 218, respectively. The output of the dynamic range clamp 210 and multiplexer 202 are provided to a one-to-one transform circuit such as adder 212. Similarly, the output of dynamic range clamp 214 and multiplexer 204 are provided to adder 216, and the output of the dynamic range clamp 218 and the output of multiplexer 206 are provided to adder 220. The outputs of adders 212, 216 and 220 are provided to video DAC 132.

In case the input video signal is $YC_RC_B$, each of dynamic range clamps 210, 214 and 218 may implement the following functions:

if input_component<MinValue then input_component= MinValue if input_component>MaxValue then input_component= MaxValue If the input video signal is RGB, each of dynamic range clamps 210, 214 and 218 may implement the following function:

input_component=input_component* scaling_factor+ offset where the scaling_factor is less than one.

The outputs of adders 212, 216 and 220 are presented to the video DAC 132 inputs for generating video output signals associated with each component color.

Figure 3:
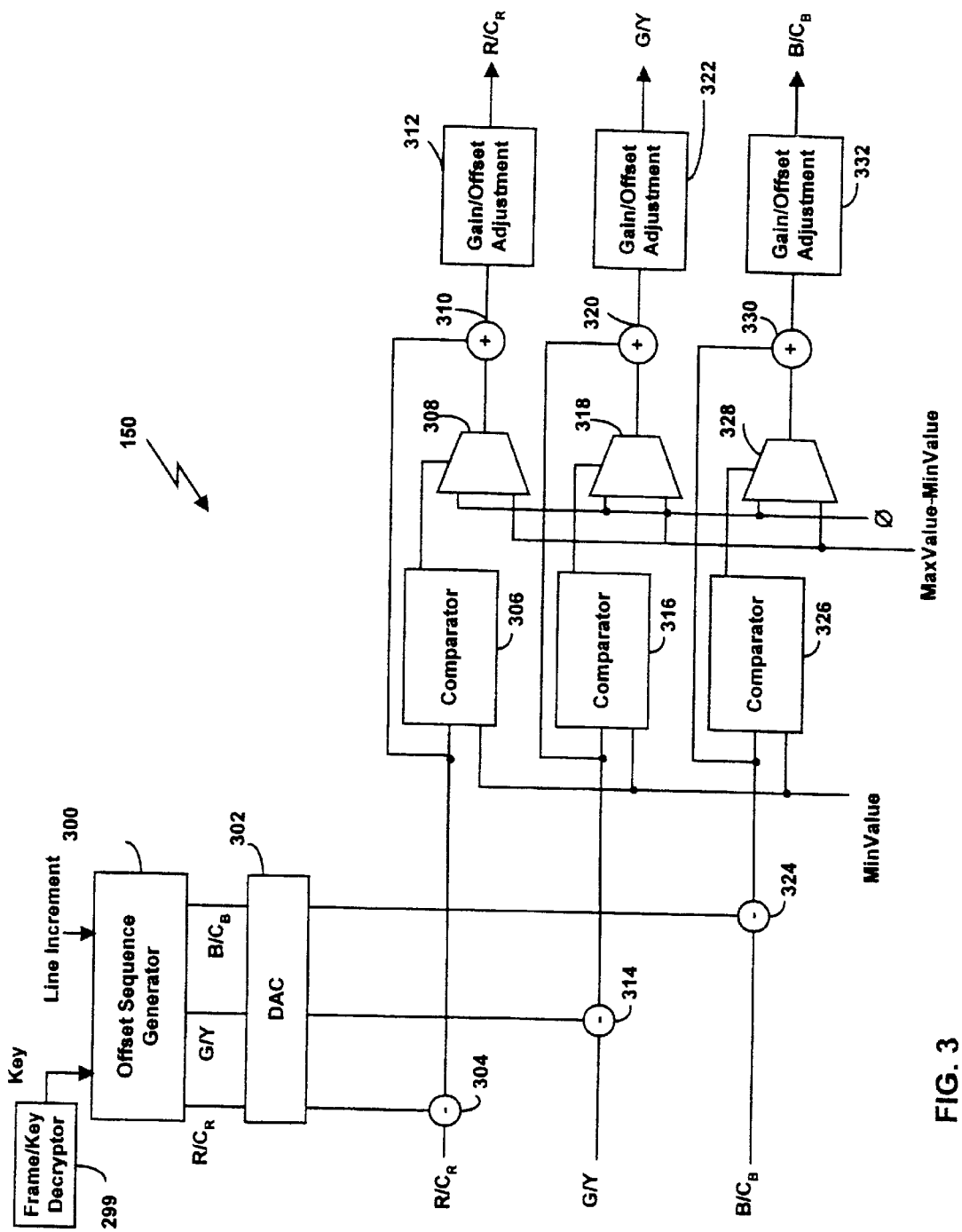
FIG. 3 is a block diagram illustrating in more detail the decryptor of FIG. 1.

Turning now to FIG. 3, decryptor 150 of receiver 140 (FIG. 1) is detailed. Decryptor 150 has an offset sequence generator 300 which is a counterpart of offset sequence generator 200 (FIG. 2). Offset sequence generator 300 receives as input a decrypted frame key signal and a line increment signal. The decrypted frame key, generated by a frame key decryptor 299, is used as a seed to a pseudo random number generator in offset generator 300, while the line increment input tells offset generator 300 that it needs to generate three offset values for the next line that receiver 140 (FIG. 1) is to render.

The offset generator 300's digital offset outputs are provided to a digital-to-analog converter (DAC) 302 which generates corresponding analog values for the three offset values. DAC 302 thus generates outputs which are associated with each component of the RGB color output. The three outputs of DAC 302 are respectively provided to the three inverse transformation circuits, such as subtractors 304, 314 and 324. Additionally, each component of the RGB or $YC_RC_B$ video input signal is respectively provided to the second input of subtractors 304, 314 and 324. The inverse transformation circuits "undo" the results achieved by the transformation circuits of FIG. 2.

The output of subtractor 304 is provided to one input of a comparator 306. The other input of comparator 306 is connected to an input value set to MinValue. The output of comparator 306 is provided to a select input of multiplexer 308. Multiplexer 308 receives zero as one of its inputs and a value of MaxValue−MinValue at a second input.

The output of multiplexer 308 is selected by the output of the comparator 306. The output of multiplexer 308 is provided to one input of an adder 310. The other input of adder 310 is connected to the output of subtractor 304. Thus, if the output of subtractor 304 is less than the MinValue, the value of Maxvalue−MinValue is added to the-output of the subtractor 304.

Correspondingly, the output of subtractor 314 is provided to one input of comparator 316. The other input of comparator 316 is connected to MinValue. The output of comparator 316 is provided to a select input of multiplexer 318. Multiplexer 318 receives zero as one of its input, and a value of MaxValue−MinValue at a second input. The output of multiplexer 318 is provided to one input of adder 320. The other input of adder 320 is connected to the output of subtractor 314. Further, the output of subtractor 324 is provided to one input of comparator 326. The other input of comparator 326 is connected to an input value set to MinValue. The output of comparator 326 is provided to a select input of a multiplexer 328 which receives zero as one of its input and a value of MaxValue-MinValue at a second input. The output of multiplexer 328 is provided to one input of an adder 330. The other input of adder 330 is connected to the output of subtractor 324.

The output of adder 310 is added to a gain/offset adjustment block 312 which restores the color component signal to its original value prior to the scaling operation performed by one of the dynamic range clamps 210, 214 and 218 (FIG. 2). The output of gain/offset adjustment block 312 is in turn provided to video drivers 152 (FIG. 1). Similarly, the output of adder 320 is added to a gain/offset adjustment block 322 which restores the color component signal to its original value prior to the scaling operation performed by one of dynamic range clamps 210, 214 and 218 (FIG. 2). The output of the gain/offset adjustment block 322 is in turn provided to video drivers 152 (FIG. 1). Also, the output of adder 330 is added to a gain/offset adjustment block 332 which restores the color component signal to its original value prior to the scaling operation performed by one of dynamic range clamps 210, 214 and 218 (FIG. 2). The output of the gain/offset adjustment block 332 is in turn provided to video drivers 152 (FIG. 1) for driving the display device 160.

Each offset generated by the offset sequence generator 200 (FIG. 2) or 300 should be applied to a time varying part of the scan line so that the offset value can not be determined. If the addition of the offset causes the color component signal value to overflow a maximum allowable signal value, then the signal value is "wrapped around" by subtracting the maximum allowable signal value and adding a minimum allowable signal value.

The addition of the offsets on each scan line shifts the color component signal of each line in a different direction, which causes the undecoded color component signal to be unviewable. Referring to FIG. 1, to decode the color component signal, receiver 140 regenerates the offset for the current scan line using the decrypted frame key, and subtracts the offset from the active region of the incoming color component signal. If the result is less than the minimum allowable signal value, then receiver 140 detects that a wrap-around, or an out-of-range condition, has occurred. If so, receiver 140 can add the maximum allowable value and subtract the minimum allowable value to compensate for wrap-around artifacts.

In order to reduce sensitivity to noise, the maximum and minimum allowable values in the shifted signal are chosen with a margin relative to the unshifted color component signal maximum and minimum values. This prevents near maximum values from being decoded as near minimum values or vice versa due to noise. Further, to maintain tracking of the maximum and minimum values between transmitter and receiver, these values can be sent in known positions in the blanking interval from transmitter 110 to receiver 140.

An alternative to wrapping-around the signal uses a transmission range which is twice as big as the original color component signal range. In this way, the addition of the offset would not cause the color component signal to exceed the transmission range. This alternative avoids the need to deal with wrap-around in transmitter 110 and receiver 140, but it reduces the scrambling of the color component signal. Keeping the offset value constant across the scan line is advantageous in that receiver 140 does not need to duplicate the pixel clock used to convert digital pixel values to analog signals on the transmitter side. Moreover, the decoding process is not sensitive to pixel clock skew between transmitter 110 and receiver 140. As such, receiver 140 only needs to track the start of new lines which can be easily determined from the horizontal sync embedded in the video signal.

Figure 4A:
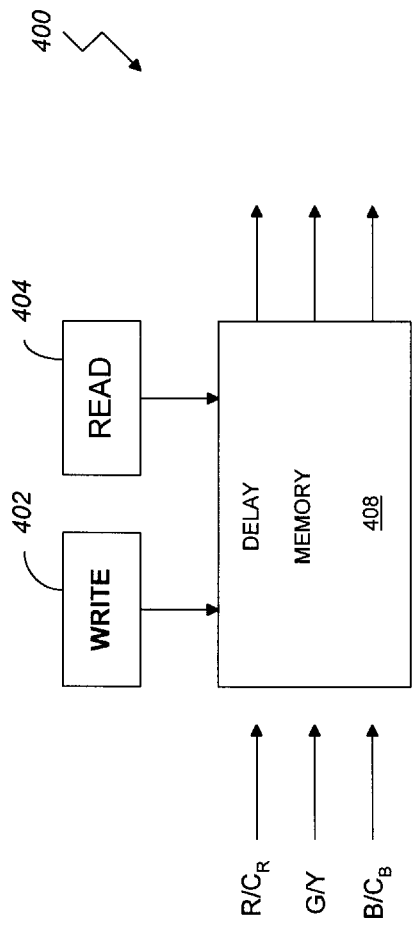
FIGS. 4A and 4B are block diagrams illustrating circuits to further inhibit unauthorized recording.
Figure 4B:
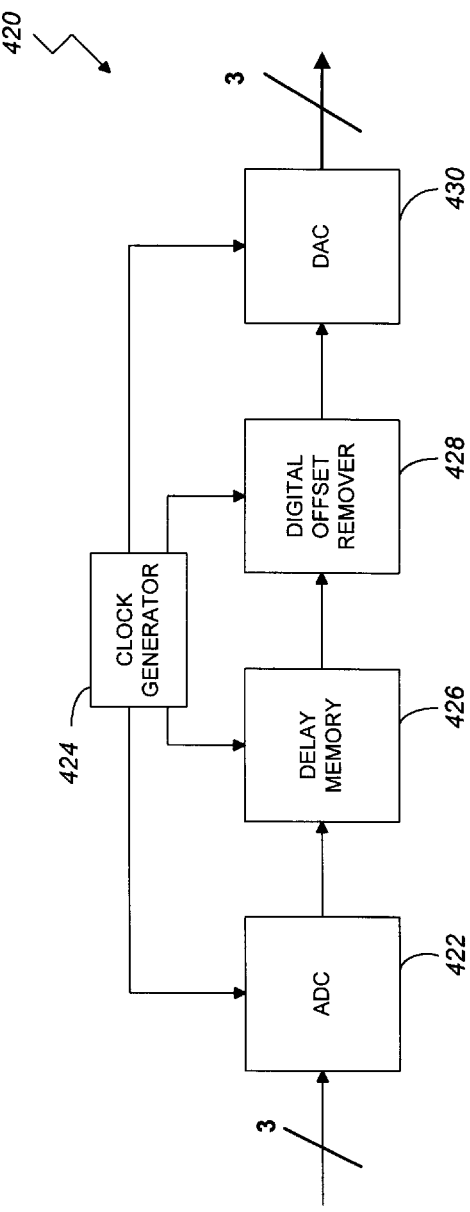

FIGS. 4A and 4B are circuits representing an optional enhancement to further inhibit unauthorized recording of high definition program content. The circuits of FIGS. 4A and 4B allow transmitter 110 (FIG. 1) to provide an additional random value on each scan line to shift active pixel components in time by an offset amount. Receiver 140 (FIG. 1) regenerates a pixel clock using a clock generator 424 which locks on a horizontal sync component of the video signal. The clock generator 424 knows in advance the pixel clock frequency, which may be transmitted over the serial ports 128 and 142.

The circuit of FIG. 4A shifts each pixel value in time within a predetermined pixel range. This operation protects against the possibility that a constant color may be used at a border of the video image and that this constant color, if known, may be used to overcome the decryption protection. To protect against this possibility, each pixel value is shifted in time within a particular pixel range. The shifting operation is performed using a delay memory 408, a dual ported memory which provides a circular queue so that its output is a time-delayed version of the input values. Delay memory 408 has a write port 402 and a read port 404. Component color values are provided to write port 402, and the delayed output is provided at read port 404.

Dual-ported memory 408 allows simultaneous access to individual static RAM arrays by encryptor 120 (FIG. 1) to implement a circular queue. Since two simultaneous accesses to stored system information can be made during the same cycle, dual-ported memories access twice the amount of information as a single-ported memory running at the same speed. Alternatively, a shared memory with multiplexed static RAMs may be used to implement the circular queue.

Receiver 140 (FIG. 1) needs to "undo" the time shift generated by the circuit of FIG. 4A by digitizing the signal and using a variable delay first in first out memory to undo the time shift. The shift amount is limited to a portion of the blanking interval so that the undo operation does not interfere with sync recovery and transmission of the minimum/maximum signal values.

Referring now to FIG. 4B, the corresponding circuit to undo to the shift-operation provided by delay memory 408 is shown. In FIG. 4B, color component values are provided to an analog-to-digital converter (ADC) 422. The output of ADC 422 is provided to a delay memory 426 which is similar to the delay memory 408 of FIG. 4A. The output of the delay memory is provided to a digital offset remover 428 for removing the offset values associated with each component. The output of digital offset remover 428 is provided to a DAC 430. Additionally, a clock generator 424, which is phase locked relative to a video sync input, is provided to clock the operation of ADC 422, delayed memory 426, digital offset remover 428 and DAC 430.

Figure 5:
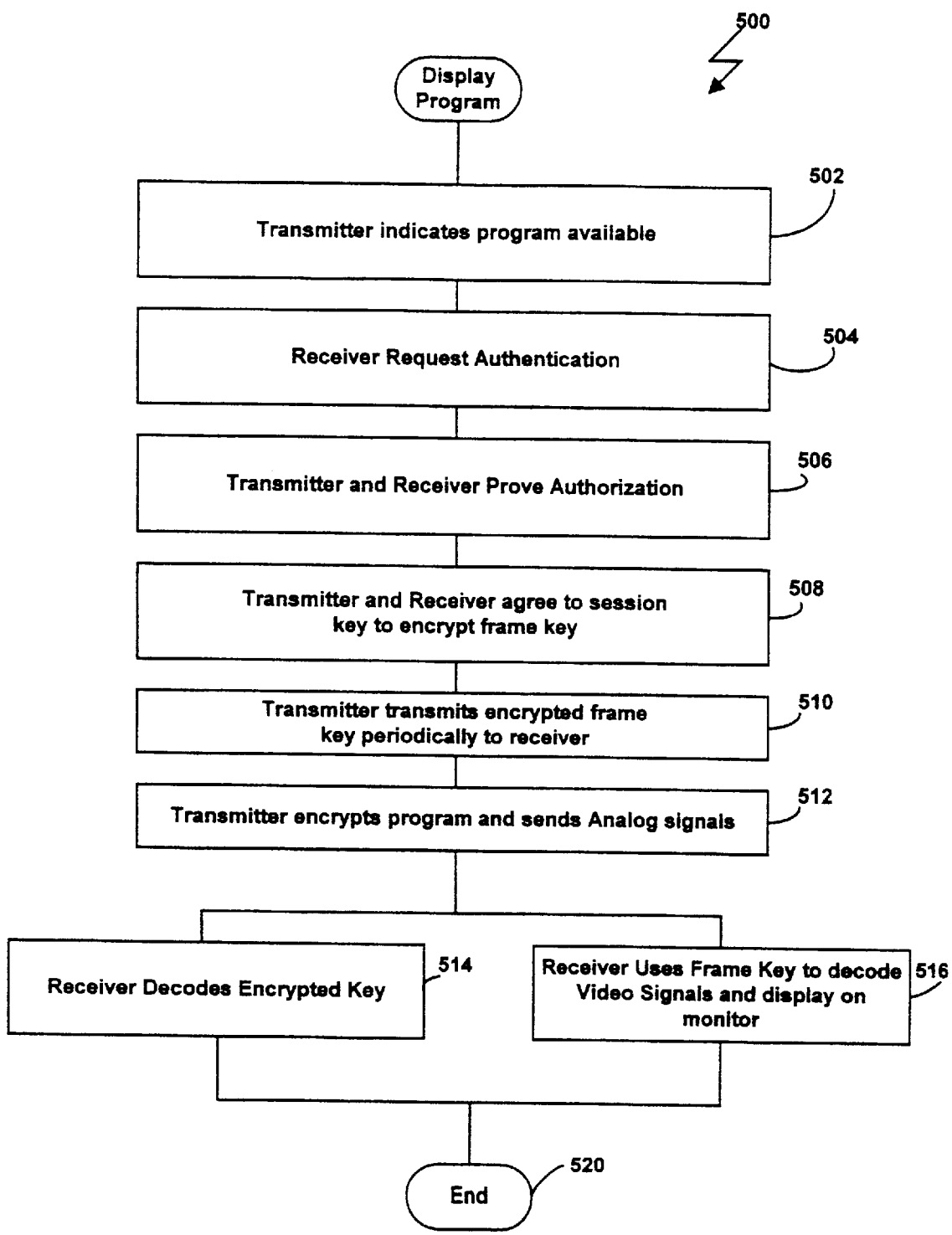
FIG. 5 is a flowchart illustrating a process for encrypting, transmitting and decrypting video content.

Turning now to FIG. 5, a flowchart 500 illustrating the operation of the system of FIG. 1 is shown. Referring to FIGS. 1 and 5, first, transmitter 110 indicates that a copy protected video program is available for viewing (step 502). In response, receiver 140 requests authentication from transmitter 110 (step 504) as discussed previously. Together, transmitter 110 and receiver 140 prove that they are authorized to receive the program (step 506). Next, the transmitter and the receiver agree to a session key which is used to encrypt a transmitted frame key (step 508).

The transmitter transmits a new encrypted frame key periodically to receiver 140 (step 510). In response, the receiver decodes the encrypted frame key (step 512). Concurrently, the receiver decodes the encrypted key (step 514) and displays the program on the monitor (step 516).

Figure 6:
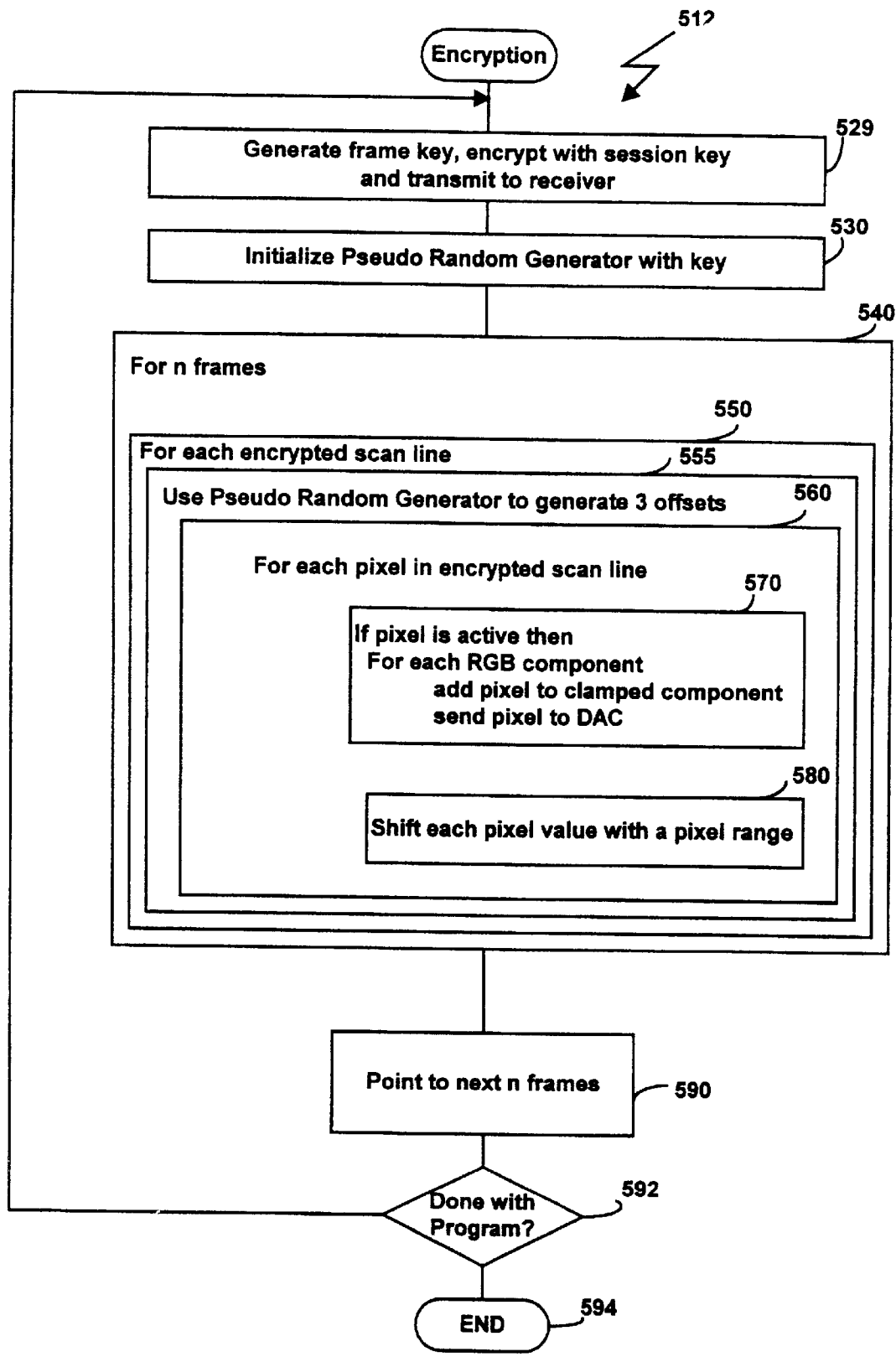
FIG. 6 is a flowchart illustrating in more detail the encryption process in FIG. 5.

FIG. 6 illustrates step 512 of FIG. 5 in more detail. Referring to FIGS. 1 and 6, first, a frame key is generated using a secret random number generator and the frame key is encrypted with the session key and transmitted to receiver 140 (step 529). Next, a pseudo random number generator is initialized with the decrypted frame key previously generated in step 508 (step 530). In step 540, for n frames, the following operations are performed: In step 550, for each encrypted scan line, the process 512 applies the pseudo random number generator to generate three offsets, each of which is associated with a color component value. Next, in step 560, for each pixel in each encrypted scan line, if the pixel is active, then for each RGB component, the process of step 512 adds the pixel to the clamped component and sends the pixel to the DAC for transmission. Next, in step 580, the value of each pixel is optionally shifted in time within a predetermined pixel range using a circuit such as that detailed in FIGS. 4A and 4B.

After the current n frames have been processed in step 540, the process of step 512 then points to the next n frames (step 590). The process of step 512 then checks whether the program has been completely displayed (step 592). If not, the process loops back to step 529. Alternatively, when the program is done, the process ends (step 594).

A pseudo-code of FIG. 6 is as follows:

---

//Encryption
Authenticate and establish session key
For entire program
    Generate a frame key using secret random number generator

```
    Encrypt frame key with session key and transmit to receiver
    Initiate pseudo random number generator with frame key
    Define encrypted region boundary and transmit to receiver
    For n frames
        For each encrypted scan line
            Generate 3 Random Offsets
            For each pixel encrypted in encrypted region
                For each color component
                    scale and add offset if RGB
                    clamp if YC_RC_B
                    add pixel to result
                    send pixels to DAC for each scan line
                    Optionally shift pixel
                End For
            End For
        End For
    End For
End For
```

Figure 7:
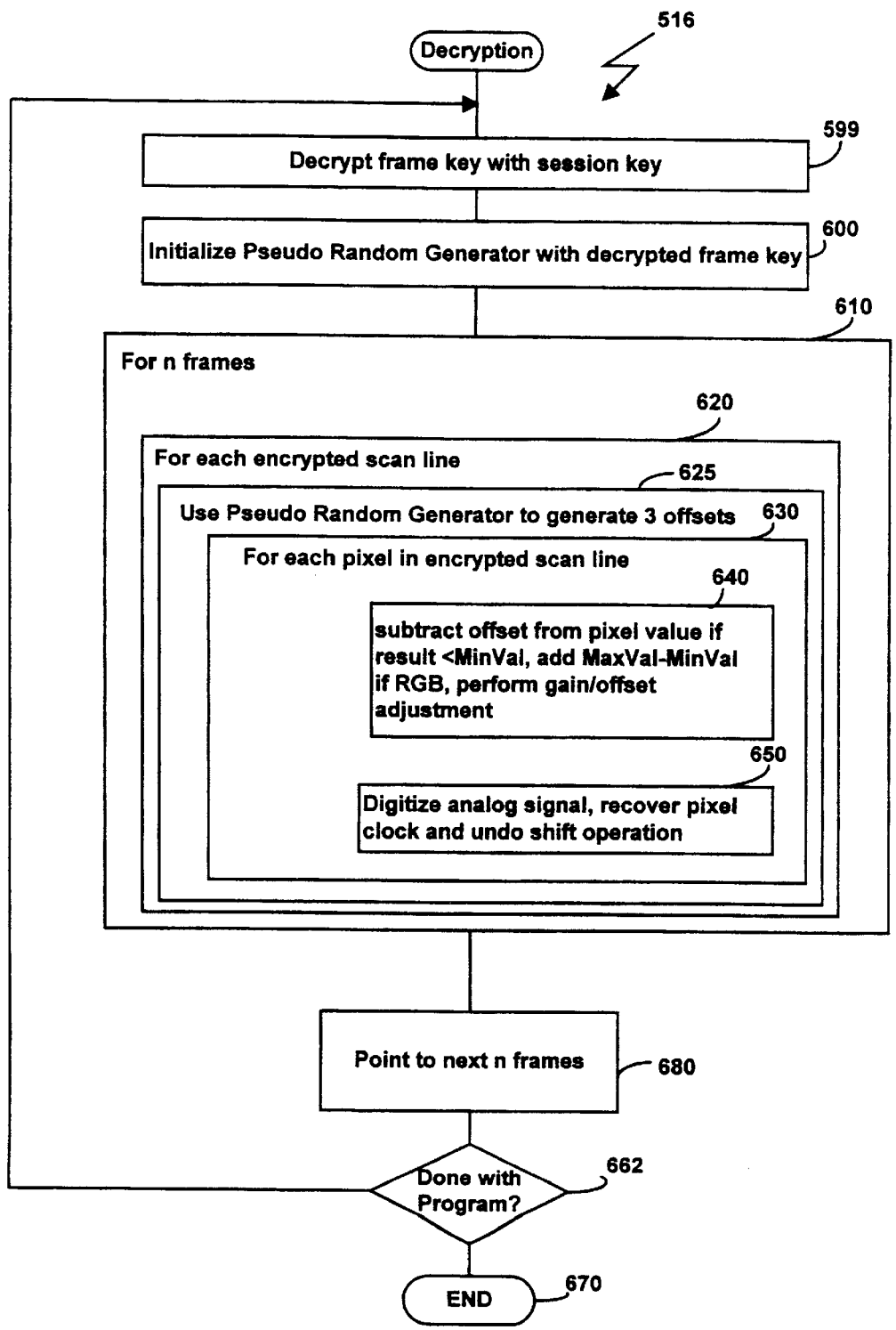
FIG. 7 is a flowchart illustrating in more detail the decryption process in FIG. 5.

Referring now to FIGS. 1 and 7, the decryption process 516 is illustrated in more detail. First, the frame key is decrypted using the session key (step 599). Next, as in the process 512 in FIG. 6, a pseudo random number generator on receiver 140 is initialized with the decrypted frame key (step 600). Then, in step 610, for each of the n frames, and for each encrypted scan liner (step 620), the pseudo random number generator is applied to generate three offsets. Further, for each pixel in the encrypted scan line, the offset is subtracted from the pixel value. If the result is less than the minimum value, an appropriate adjustment of Maxvalue–MinValue is added to the result of the subtraction process. In the event that the signal is RGB, a gain/offset adjustment operation is performed.

Additionally, in the event of the encryption process 516 performs the optional shift operation of step 580. (FIG. 6), the analog signal is digitized and pixel clock is recovered to undo the shift operation previously performed (step 650).

After step 610, process 516 then points to the next n frames (step 660). Next, the process checks whether it has completed displaying the program (step 662). If not, the process loops back to step 599 to continue handling the next n frames. Alternatively, in the event that the encryption process is finished in step 662, the process ends (step 670). A pseudo-code of FIG. 7 is shown below:

```
//Decryption
Authenticate and establish session key
For entire program
    Decrypt frame key with session key
    Initiate pseudo random number generator with frame key
    Define Encrypted Region Boundary
    For n frames
        For each encrypted scan line
            Generate 3 Random Offsets
            For each encrypted pixel
                Subtract offset from pixel value
                if result < MinVal, add MaxVal-MinVal
                if RGB, perform gain/offset adjustment
                if pixels have been shifted, undo pixel shift
                                                    operation
            End For
        End For
    End For
End For
```

Referring to FIG. 1, transmitter 110 can transmit the next frame key to the receiver 140 in advance so that the decryption of the frame key may occur in parallel with the rendering of the current frame.

Figure 8:
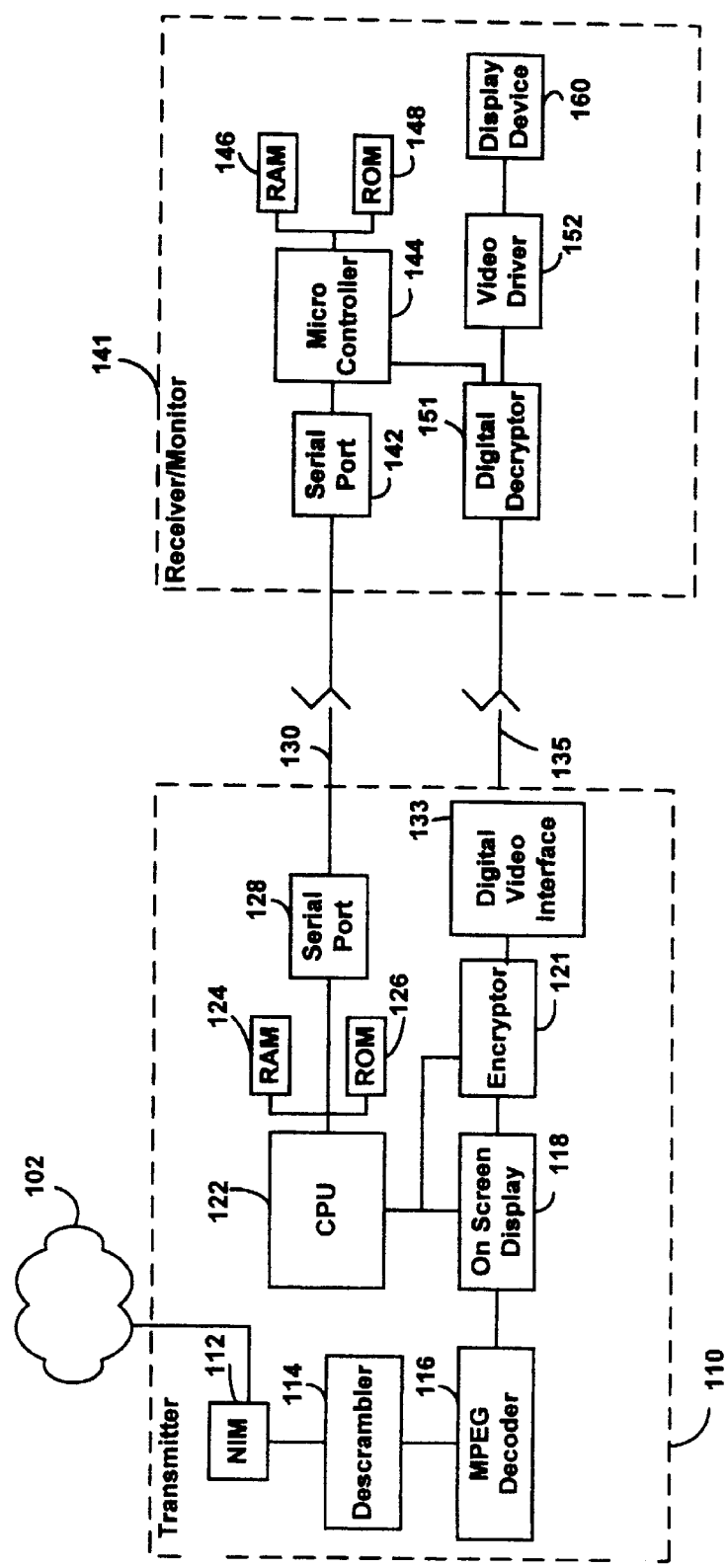
FIG. 8 is a diagram of a second embodiment of the system for controlling reproduction of high quality program contents.

Referring now to FIG. 8, a second embodiment of the transmitter-receiver pair is shown. The embodiment of FIG. 8 is similar to the embodiment of FIG. 1 except that the video transmission is digital. Thus, like-numbered elements are the same as those in FIG. 1. In FIG. 8, transmitter 110 receives high definition compressed bitstreams from network 102. Transmitter 110 communicates with network 102 using network interface module (NIM) 112. The output of NIM 112 is an encrypted video bitstream which is directed to descrambler 114. The output of descrambler 114 is provided to MPEG decoder 116, which in turn provides a signal to on screen display (OSD) buffer 118 controlled by CPU 122.

Figure 9:
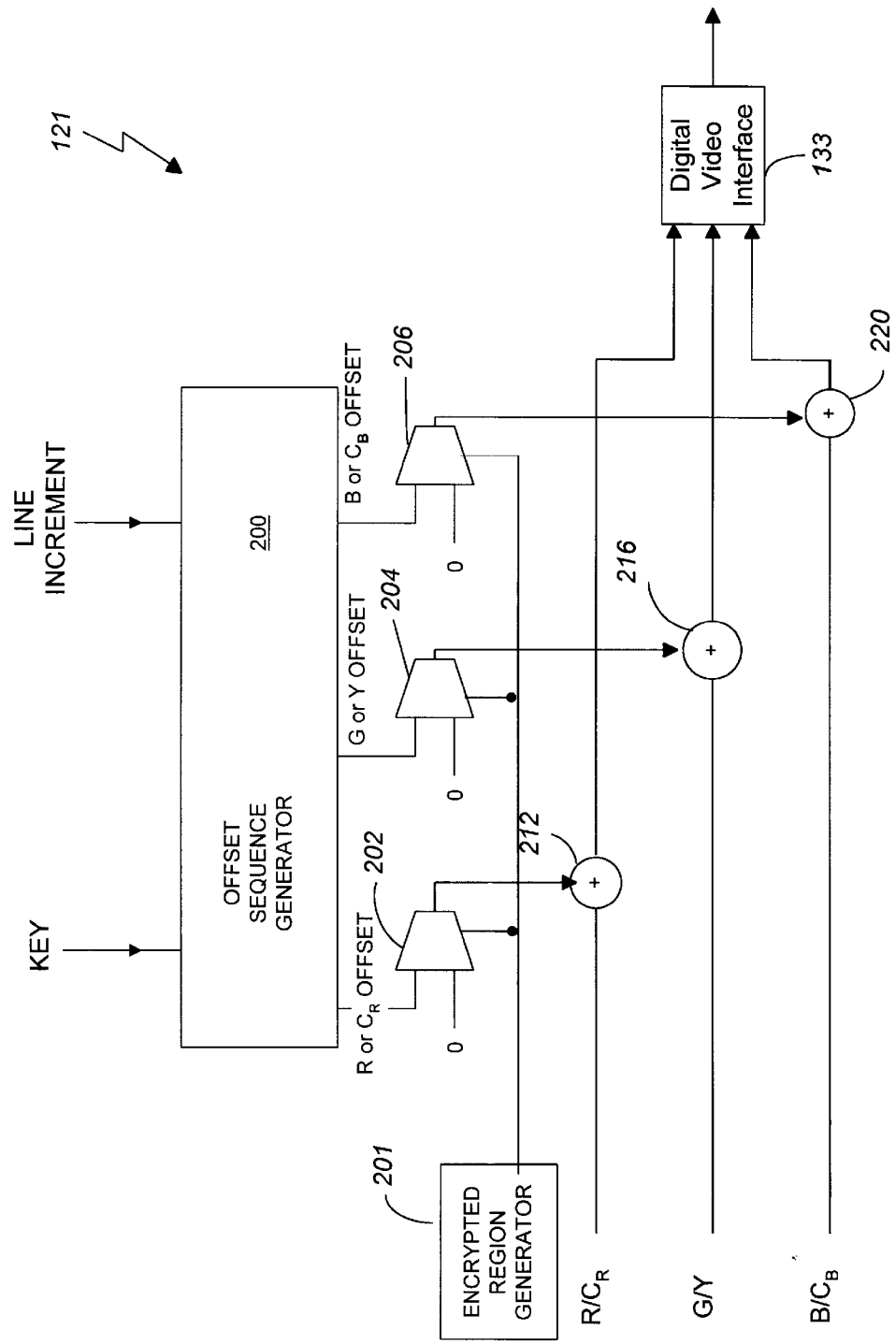
FIG. 9 is a block diagram illustrating in more detail the digital encryptor of FIG. 8.

CPU 122 is also connected to a digital encryptor 121 which is shown in more detail in FIG. 9. The output of digital encryptor 121 is provided to a digital video interface 133, which is connected to digital video cable 135. Video cable 135 may be bundled or combined with digital interface cable 130 as one cable or separately as two cables.

Low bandwidth digital data is transmitted over the digital interface cable 130 to and from a serial port 142 on a digital receiver 141. Serial port 142 is connected to the microcontroller or CPU 144. Microcontroller 144 in turn is connected to RAM 146 and ROM 148. Additionally, digital receiver 141 receives digital video signals from digital video cable 135. The video signals are processed by a digital decryptor 151, which is shown in more detail in FIG. 10. The video content which appears at the output of digital decryptor 151 is provided to video driver 152 which drives the display device 160.

Referring now to FIG. 9, digital encryptor 121 is shown in more detail. Again the same numbering as FIG. 2 is used. Encryptor 121 (FIG. 1) has offset sequence generator 200 which receives as inputs an unencrypted frame key input and a line increment input. The offset,sequence generator selects a one-to-one transformation function unique to each scan line for the RGB or YC_RC_B color component signals. Each of the three color component outputs of the offset sequence generator 200 is provided to one input of multiplexers 202, 204 and 206, respectively. The other inputs of the multiplexers 202, 204 and 206 receive zero. The select input of the multiplexers 202, 204 and 206 are driven by encrypted region generator 201 which stores a window indicating where pixels are encrypted.

Each of the video component color signals, either RGB signals or YC_RC_B signals, are provided to one of three one-to-one transform circuits 212, 216 and 220, which may be adders. The other input of each of the one-to-one transform circuits 212, 216 and 220 receive the output of multiplexers 202, 204 and 206, respectively. The outputs of circuits 212, 216 and 220 are presented to digital video interface 133 for transmission to the receiver 140 (FIG. 1).

Figure 10:
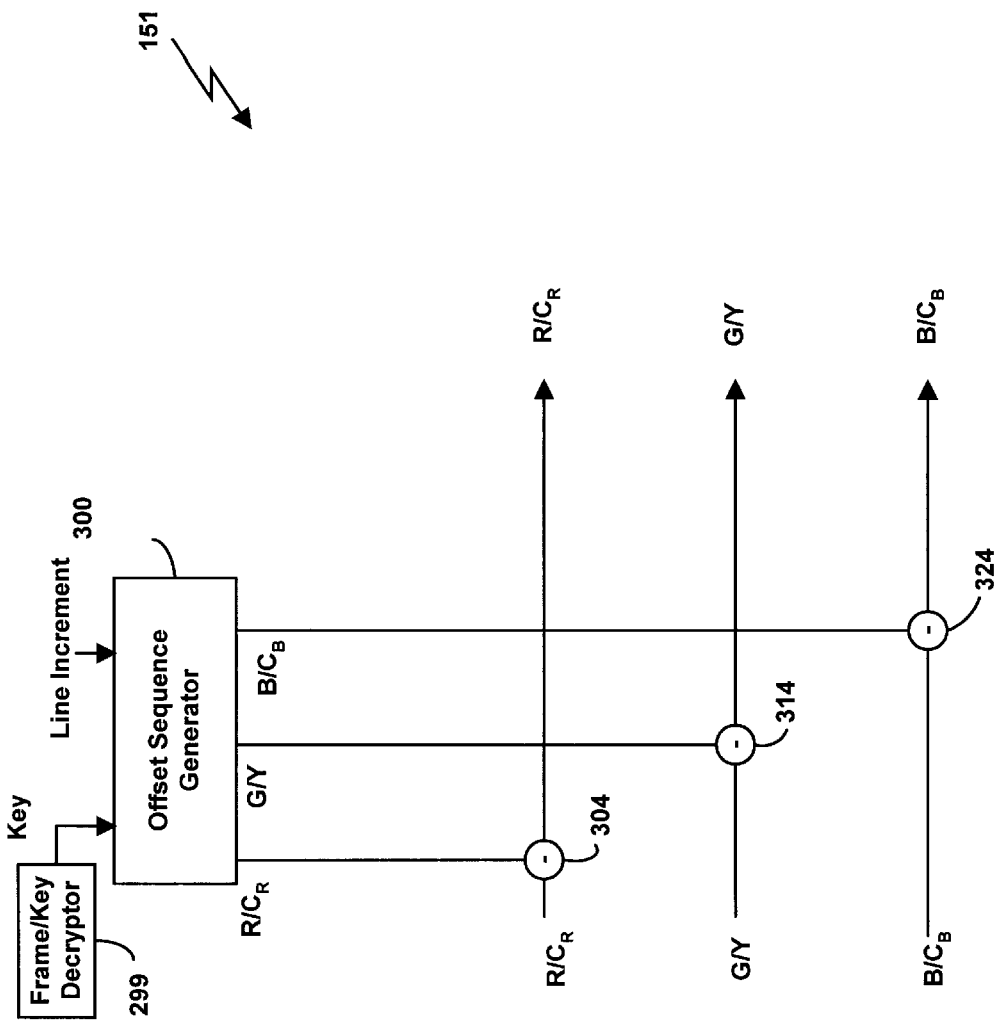
FIG. 10 is a block diagram illustrating in more detail the digital decryptor of FIG. 8.

Turning now to FIG. 10, digital decryptor 151 on digital receiver 141 (FIG. 8) is detailed. Digital decryptor 151 has an offset sequence generator 300 which is a counterpart of the offset sequence generator 200 (FIG. 9). Offset sequence generator 300 receives as input a decrypted frame key signal and a line increment signal.

Each of offset generator's digital offset outputs are provided to one input of inverse transformation circuits such as subtractors 304, 314 and 324, respectively. The output of inverse transformation circuits such as subtractors 304, 314 and 324 are in turn provided to video driver 152 (FIG. 8) for driving the display 160 (FIG. 8). In the event that display 160 accepts analog inputs, a video DAC would be used on the output of digital decryptor 151 to convert the output to analog form. In the event that both analog and digital video inputs and outputs are to be handled, the transmitter can include both analog and digital encryptors 120 and 121 (FIGS. 1 and 8, respectively), and the receiver can include both analog and digital decryptors 150 and 151, respectively.

The techniques described here may be implemented in hardware or software, or a combination of the two. Software may include microcode or conventional program implemented in a high level procedural or object-oriented programming language to communicate with a computer system. However, the programs can be implemented in assembly or machine language, if desired.

In the event the techniques are implemented in computer programs executing on programmable computers with a processor, a storage medium readable by the processor (including volatile and nonvolatile memory and/or storage elements), and suitable input and output devices, the program code is applied to data from an input device to perform the functions described and to generate the encoded high definition video signal to be saved on a digitally recordable data storage device or transmitted over a medium.

While the invention has been shown and described with reference to one or more embodiments thereof, those skilled in the art will understand that the above and other changes in form and detail may be made without departing from the spirit and scope of the following claims.

What is claimed is:

1. A method for controlling reproduction of video transmission between a transmitter and a receiver, the transmitter and the receiver communicating over a digital interface and a video interface, the video interface having a color component signal, comprising:

communicating an encrypted frame key over the digital interface;

generating a sequence of pseudo-random offsets for the color component signal based on the frame key;

generating an encoded color component signal using one of the pseudo-random offsets; and transmitting the encoded color component signal over the video interface.

2. The method of claim 1 further comprising seeding a pseudo random number generator with the frame key.

3. The method of claim 1 further comprising:

periodically generating a new frame key; and initializing a pseudo random number generator with the new frame key.

4. The method of claim 1 further comprising:

scaling the color component signal with a predetermined ratio.

5. The method of claim 1 further comprising clamping the color component signal within a predetermined range.

6. The method of claim 5 wherein the clamping step further comprises:

determining if a value of the color component signal is less than a first value and if so, setting the value of the color component signal to the first value; and determining if the value of the color component signal is greater than a second value and if so, setting the value of the color component signal to the second value.

7. The method of claim 6 further comprising:

determining whether each pixel is in an encrypted boundary; and transmitting the pixel unencrypted if the pixel is outside of the encrypted boundary.

8. The method of claim 1 further comprising converting the encoded color component signal to an analog signal.

9. The method of claim 1 further comprising shifting each pixel value in time within a predetermined pixel range.

10. The method of claim 9 wherein the shifting further comprises providing the encoded color component signal to a delay memory.

11. The method of claim 1 further comprising decrypting the encoded color component signal sent over the video interface.

12. The method of claim 11 wherein the decrypting step further comprises:

receiving the encrypted frame key over the digital interface; and generating the sequence of pseudo-random offsets for the encoded color component signal based on the encrypted frame key.

13. The method of claim 11 further comprising seeding a pseudo random number generator with the frame key.

14. The method of claim 11 further comprising subtracting the pseudo-random offset from the encoded color component signal.

15. The method of claim 14 further comprising compensating for out-of-range values associated with the subtracting step.

16. The method of claim 14 further comprising resealing the color component signal to its original input range.

17. The method of claim 11 further comprising shifting each pixel value within a predetermined pixel range prior to the step of transmitting the encoded color component signal over the video interface.

18. The method of claim 17 further comprising undoing the pixel shift operation using a delay memory.

19. The method of claim 11 further comprising displaying the color component signal after decrypting the encoded color component signal.

20. The method of claim 1 further comprising:

adding the one of the pseudo-random offsets to the color component signal.

21. A method for controlling the reproduction of a video transmission between a transmitter and a receiver, the transmitter and the receiver communicating over a digital interface and a video interface, the video interface having one or more color component signals, comprising:

authenticating the transmitter and the receiver using the digital interface;

periodically transmitting an encrypted frame key to the receiver over the digital interface;

generating a pseudo-random offset at the transmitter for each color component signal during an active part of a scan line;

adding the pseudo-random offset to the color component signal to generate an encoded color component signal;

transmitting the encoded color component signal over the video interface;

generating the pseudo-random offset at the receiver based on the decrypted frame key;

removing the pseudo-random offset from the encoded color component signal transmitted over the video interface to generate a decoded color component signal; and displaying the decoded color component signal on a display device.

22. A system for controlling the reproduction of video transmission between a transmitter and a receiver, the transmitter and the receiver communicating over a digital interface and a video interface, the digital interface communicating a frame key between the transmitter and the receiver, the video interface having a color component signal, the system comprising:
   an encryptor, including:
      an offset generator adapted to receive the frame key and to generate a sequence of pseudo-random values for the color component; and
      an adder coupled to the offset generator and to the color component signal for providing.an encoded color component signal;
   a decryptor, including:
      a decryptor offset generator adapted to receive and decrypt the frame key and to generate a decryptor pseudo-random value for the color component signal; and
      a subtractor coupled to the decryptor offset generator and to the color component signal for subtracting the decryptor pseudo-random value from the color component signal.

23. The system of claim 22 wherein the color component signal includes one of red, green and blue (RGB) video signals.

24. The system of claim 22 wherein the color component signal includes one of luminance and chrominance video signals.

25. The system of claim 22 wherein the color component signal is a black and white video signal.

* * * * *